(No Model.)

W. BURROWS.
PULL FOR WATER CLOSET CISTERNS, &c.

No. 353,844. Patented Dec. 7, 1886.

Witnesses:
J. Staib
Chas. H. Smith

Inventor:
William Burrows
per Lemuel W. Serrell
Atty.

UNITED STATES PATENT OFFICE.

WILLIAM BURROWS, OF BROOKLYN, NEW YORK.

PULL FOR WATER-CLOSET CISTERNS, &c.

SPECIFICATION forming part of Letters Patent No. 353,844, dated December 7, 1886.

Application filed September 24, 1886. Serial No. 214,413. (No model.)

*To all whom it may concern:*

Be it known that I, WILLIAM BURROWS, of Brooklyn, in the county of Kings and State of New York, have invented an Improvement in Pulls for Water-Closet Cisterns, Bells, Shades, &c., of which the following is a specification.

Bell-pulls have been made of vitrified material—such as porcelain—and rubber has been used upon drawer knobs, pulls, &c., to prevent injury to the surface against which the pull or knob may strike.

My invention relates to a pull especially adapted to water-closet cisterns, but which may be used for other objects. I employ a tubular body of glass, celluloid, or other ornamental material, with washers of elastic material—such as rubber—at the ends, and head-pieces of wood or other material, and a rod passing through the parts, with an eye and head at one end and a screw and nut at the other end to clamp the parts together. The tubular body is highly ornamental, and the elastic washers prevent the glass or other body coming forcibly into contact with the wall or other part of the building, and either injuring the same or being injured thereby.

Figure 1:
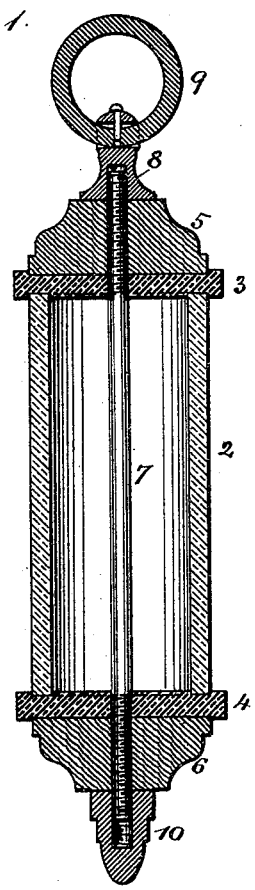
Figure 2:
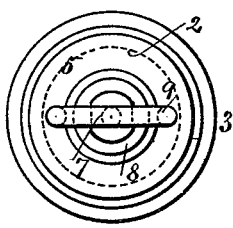

In the drawings, Figure 1 is a vertical section of the pull-handle, and Fig. 2 is a plan view of the same.

The tube 2 forms the body of the handle, and the same is preferably of glass, and at the ends thereof are the elastic washers 3 4, usually of rubber, with the edges projecting beyond the tubular body, and the heads 5 and 6 are of wood or other suitable material and flat where they come against the washers, and they are of about the same diameter as the tubular body, and more or less ornamental in their shape. Through these heads, the washers, and the tube the central rod, 7, passes. At one end it is provided with the head 8 and suspending-ring 9, and at the other end is a screw for the nut 10, by which the parts are firmly clamped together. This nut allows the parts to be separated for cleaning or for changing the parts. The tubular body, when of glass or celluloid, is easily kept clean, and it is highly ornamental, and when made of transparent glass it allows for the insertion of the name of the closet or the name of the manufacturer, or any advertisement upon a paper or card inserted into such glass tube. The glass is protected from injury by the washers that project beyond the same, and these washers also prevent injury to the wall or wood-work with which the pull may be brought into contact.

The parts being detachable allows for the insertion of any desired character of tubular body between the washers and heads.

I claim as my invention—

The combination, in a pull, of a tubular glass body, elastic washers at the ends thereof and projecting beyond the body to protect the same, head-pieces and a nut, and a screw passing through the parts to hold them together and clamp the washers to the body, and the suspending-ring at the end of the rod, substantially as specified.

Signed by me this 21st day of September, 1886.

WILLIAM BURROWS.

Witnesses:
WALLACE L. SERRELL,
WILLIAM G. MOTT.